(12) United States Patent
Zaidi

(10) Patent No.: US 10,831,985 B2
(45) Date of Patent: Nov. 10, 2020

(54) PROCESSING DUPLICATE MULTIMEDIA CONTENT

(71) Applicant: Syed Mohammed Mohsin Zaidi, Ellicott City, MD (US)

(72) Inventor: Syed Mohammed Mohsin Zaidi, Ellicott City, MD (US)

( * ) Notice: Subject to any disclaimer, the term of this patent is extended or adjusted under 35 U.S.C. 154(b) by 3 days.

(21) Appl. No.: 16/392,213

(22) Filed: Apr. 23, 2019

(65) Prior Publication Data

US 2019/0325008 A1 Oct. 24, 2019

Related U.S. Application Data

(60) Provisional application No. 62/661,358, filed on Apr. 23, 2018.

(51) Int. Cl.
*G06F 17/00* (2019.01)
*G06F 40/106* (2020.01)
*G06T 1/00* (2006.01)

(52) U.S. Cl.
CPC .......... *G06F 40/106* (2020.01); *G06T 1/0007* (2013.01)

(58) Field of Classification Search
CPC .............................. G06F 40/106; G06T 1/0007
USPC ......................................................... 715/204
See application file for complete search history.

(56) References Cited

U.S. PATENT DOCUMENTS

| 5,809,179 | A  | * | 9/1998  | Marimont ................. G06T 7/12 382/173 |
| 6,363,418 | B1 |   | 3/2002  | Conboy et al. |
| 7,671,864 | B2 |   | 3/2010  | Roman |
| 7,716,183 | B2 | * | 5/2010  | Lee ..................... G06F 11/1446 707/639 |
| 7,882,315 | B2 | * | 2/2011  | Tsai .................... G06F 11/1435 711/162 |
| 8,170,095 | B2 |   | 5/2012  | Roman |
| 8,239,749 | B2 | * | 8/2012  | Williamson ............ G06F 40/14 715/211 |
| 8,817,083 | B2 |   | 8/2014  | Nagase et al. |
| 9,571,823 | B2 |   | 2/2017  | Nagase et al. |

(Continued)

OTHER PUBLICATIONS

Christlein et al., An Evaluation of Popular Copy-Move Forgery Detection Approaches, IEEE 2012, pp. 1841-1854. (Year: 2012).*

(Continued)

*Primary Examiner* — Cong-Lac Huynh
(74) *Attorney, Agent, or Firm* — Rahman LLC

(57) ABSTRACT

Multimedia content processing in a computing device includes providing a first multimedia content to be displayed in a first region of a display device; establishing a second region on the display device where a second multimedia content is to be displayed; loading an electronic document on the display device causing the first multimedia content to be displayed in first region on the display device; copying the first multimedia content displayed in the first region by creating the second multimedia content from the first region; analyzing raster data associated with the first multimedia content to store image data from a snapshot of the first multimedia content; storing raster data associated with each pixel of the first multimedia content in a local storage of the computing device; creating a duplicate version of the first multimedia content based on stored image pixel data; and displaying the second multimedia content in the second region.

20 Claims, 10 Drawing Sheets

(56) References Cited

U.S. PATENT DOCUMENTS

| | | | | |
|---|---|---|---|---|
| 9,800,904 | B2* | 10/2017 | Clapp | H04N 21/6143 |
| 9,979,894 | B1* | 5/2018 | Kokemohr | G06T 5/008 |
| 2004/0003117 | A1* | 1/2004 | McCoy | H04L 67/303 |
| | | | | 709/246 |
| 2005/0074139 | A1* | 4/2005 | Seo | G06T 1/0057 |
| | | | | 382/100 |
| 2005/0212761 | A1* | 9/2005 | Sawada | G09G 3/344 |
| | | | | 345/156 |
| 2007/0094231 | A1* | 4/2007 | Kim | G11B 27/329 |
| 2007/0150612 | A1* | 6/2007 | Chaney | H04L 67/02 |
| | | | | 709/231 |

OTHER PUBLICATIONS

Zhang et al., A New Approach for Detecting Copy-Move Forgery in Digital Images, IEEE 2008, pp. 362-366. (Year: 2008).*

* cited by examiner

50b

50a

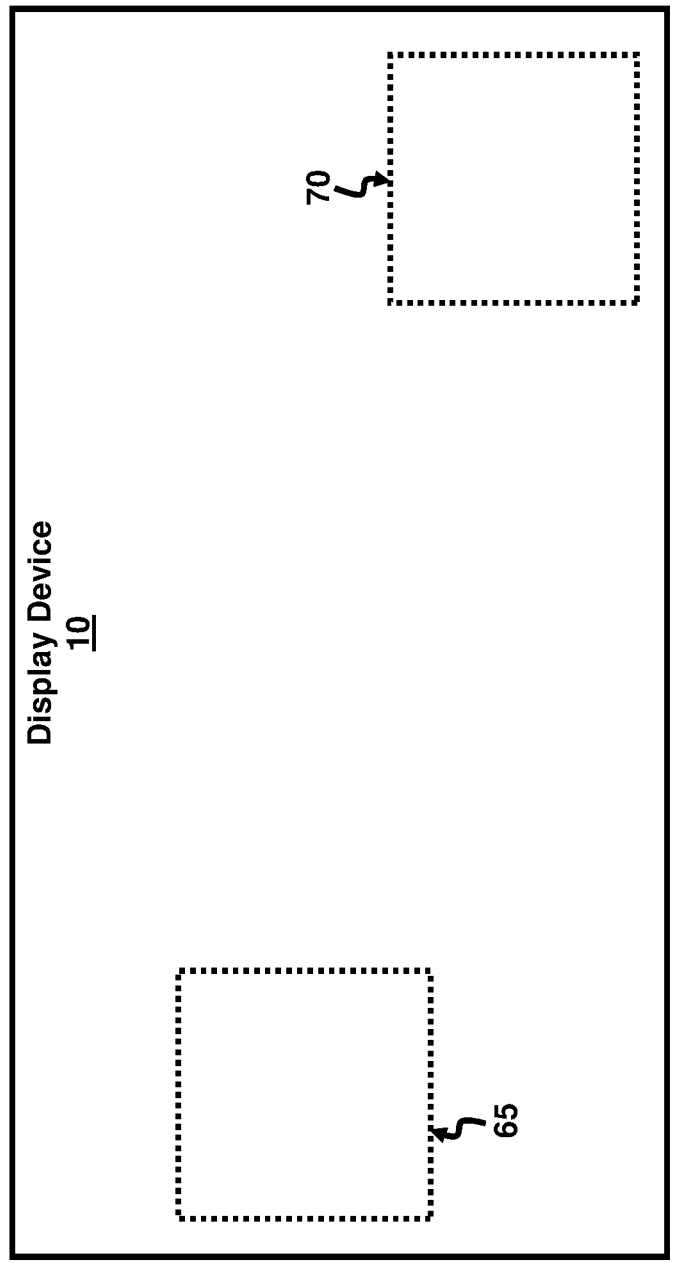

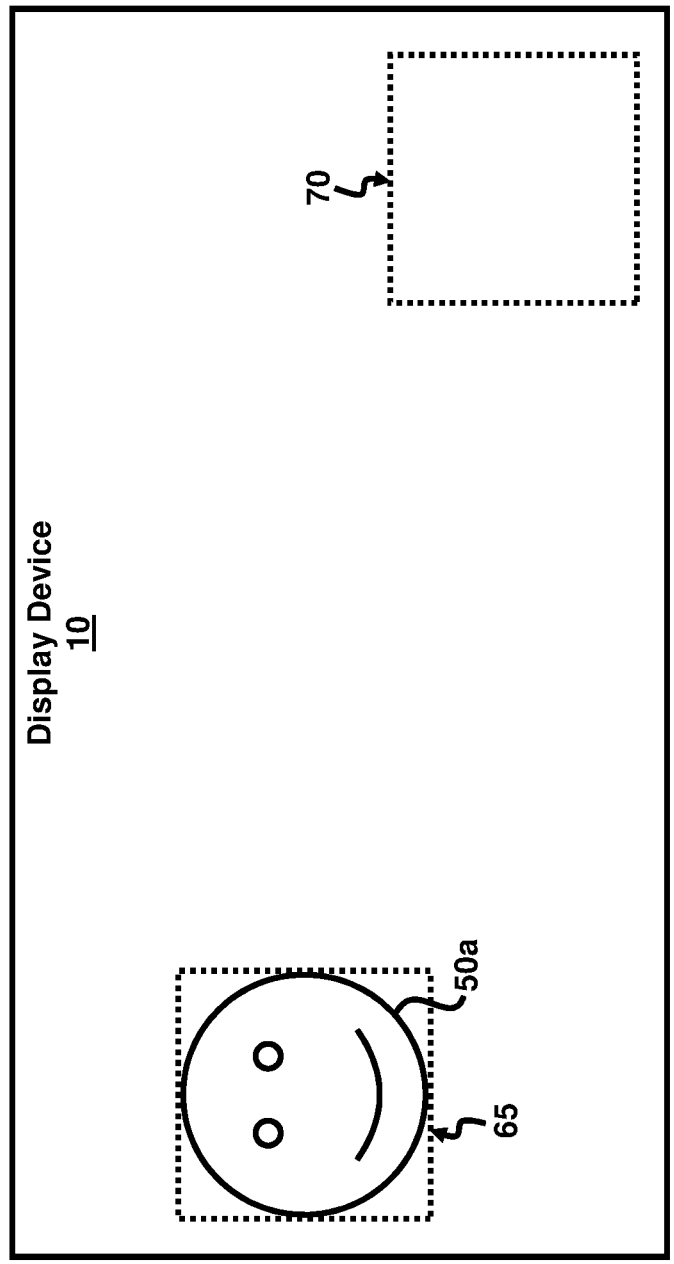

PROCESSING DUPLICATE MULTIMEDIA CONTENT

CROSS-REFERENCE TO RELATED APPLICATIONS

This application claims the benefit of U.S. Provisional Application No. 62/661,358, filed on Apr. 23, 2018 and entitled "PROCESSING DUPLICATE MULTIMEDIA CONTENT," the complete disclosure of which, in its entirety, is hereby incorporated by reference.

BACKGROUND

The embodiments herein generally relate to image processing, and more particularly to creating duplicate computer images.

SUMMARY

In view of the foregoing, an embodiment herein provides a technique to display duplicate content without using X times the amount of bandwidth by reading the pixels of a specific region of a display device in the form of an image/snapshot to create identical content based on the original content using the image pixel data of the snapshot of the original content. This is performed on the same computing device in order to reduce bandwidth usage. The original content can be called/retrieved from an application programming interface (API), content embedded onto an electronic document such as a webpage or application software (app), as well as other ways of retrieving content. Instead of loading multiple copies of that content onto the computing device (whether it is a website, app, etc.), only one copy is needed to be loaded, and pixel values are analyzed and stored as a template in the form of a new image in order to display as many copies as desired without the requirement for using additional bandwidth. There are techniques to read pixel values, coordinates, and alpha data of an image, and to save images. However, the conventional solutions do not provide a way to set a specific finite area on a display device to analyze whatever content (image, video, etc.) that is in that area to then display copies of that area/content (frame) without having to use extra bandwidth as it would take when loading X number of that content onto that webpage/app/device without the techniques provided by the embodiments herein.

The embodiments herein provide a technique such that only one copy of the content has to be loaded onto the device instead of X number of content, thus reducing bandwidth usage since only one of the X number of content has to use bandwidth to be displayed. This duplicating and displaying of X number of that content occurs automatically and in real-time without requiring any user input. Moreover, the technique provided by the embodiments herein relies on the processing power of the computing device instead of bandwidth. The technique can be used to create a mirror/copy of the content, without having to load multiple versions of that one type of content, as well as several other uses.

This technique can be applied to any sized device. For example, if a display device is 2048×1536, a "create new image" function defined with specific dimensions can be set in a particular area (for example, the top left area) of the display device that is 300×300 to be where image pixel analysis will take place once the original content loads using an on load function to trigger the create new image function that takes a snapshot of that area and sets it as a new image to access pixel data of that image. The original content can be loaded onto that page via a content embed (e.g., the content embed can be formatted to fit inside the region where pixel analysis will take place from the new image created from that region). The original content does not necessarily have to perfectly fit into the area where pixel analysis will take place, but it should fit in that area if all of that content is to be displayed as a duplicate. An iframe/content embed/image embed function can be set at the bottom right of the display device with dimensions of 300×300 where the desired duplicate content should display with the source set to reference a 'new image' that is stored in the local storage. Any content that is displayed in that top left area 300×300 range is then set as a 'new image' of dimension 300×300 using the create new image function once the original content loads in that area. The new image is then analyzed for the pixel values of Red (R), Green (G), Blue (B), alpha data (transparency), and coordinates (x,y) of the pixels. This means that the image is stored in the local storage as a variable to be accessed later by any requesting duplicate content embeds. That image pixel data is stored as a string or array in a data buffer or local storage of the computing device, can use base64 to make it easier to retrieve. The image data is then retrieved from the local storage to be compiled and displayed in the bottom right 300×300 space using an iframe/embed function. Only the original embed function to display the original content requires bandwidth to load the content, while the duplicate content uses processing power to retrieve data from the array to create an image without the use of bandwidth. This process can be repeated as many times as necessary, as the data in the local storage or data buffer can be overwritten by new data from a new piece of content.

BRIEF DESCRIPTION OF THE DRAWINGS

The embodiments herein will be better understood from the following detailed description with reference to the drawings, in which:

FIG. 4A is a schematic diagram illustrating a display device with predefined areas for placement of multimedia content, according to an embodiment herein;

FIG. 4B is a schematic diagram illustrating a display device showing placement of original multimedia, according to an embodiment herein;

DETAILED DESCRIPTION

Figure 1:
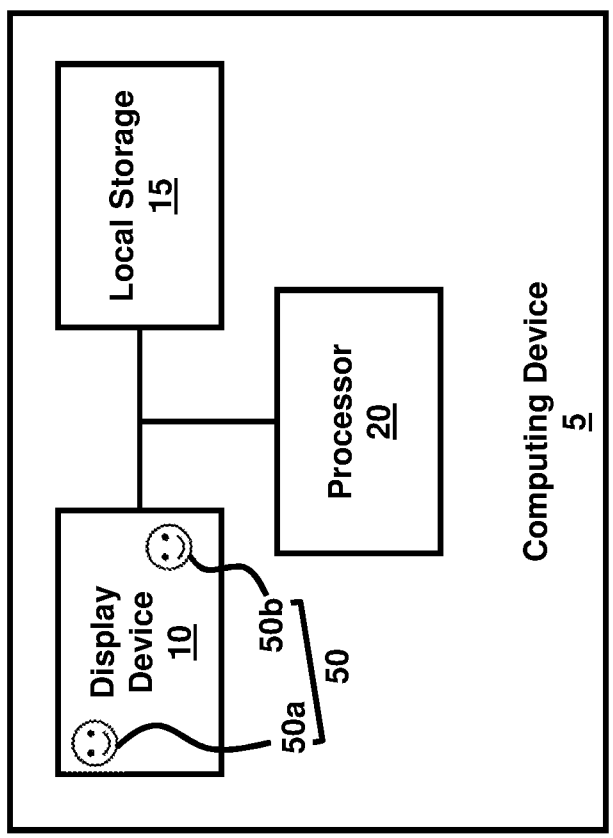
FIG. 1 is a block diagram illustrating a computing device, according to an embodiment herein.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an image/video processing technique such that if it is desired to display two identical images, videos, etc. on the same webpage, website, or app, etc. of a display device, instead of having to load two or more separate identical images, videos, etc., only one image, video, etc. has to be loaded and the pixels of the first image/video frame are read, copied, saved in the local storage, and then displayed in both the original location and target location of the display device resulting in two or more duplicate images, videos, etc. Accordingly, the technique only utilizes a fraction of the bandwidth since only one of the X number of images, videos, etc. have to be loaded for display. There is a difference between how this technique works when processing images versus when processing videos. Referring now to the drawings, and more particularly to FIGS. 1 through 5, where similar reference characters denote corresponding features consistently throughout the figures, there are shown exemplary embodiments.

FIG. 1 illustrates a computing device 5 to reduce bandwidth usage when displaying identical multimedia, such as videos, pictures, images, content, etc. There is a slight difference between how images are processed with this technique versus how videos are processed with this technique. This technique is performed with multimedia 50 on the same webpage, app, or display device 10 by reading the pixel values of an image or frame of the multimedia in real-time using processor 20, storing the data in local storage 15, for example, as a string or array, and using that stored data (in the form of an image) as a template to display identical content on the same display device 10. A create new image function may be used to set a defined spot on the display device 10 where the original copy of the content is to be loaded and where the pixels are analyzed of that snapshot of the new image from the create new image function. Thereafter, using content (image) embed functions, multiple places are set on the display device 10 where the identical copies of the multimedia 50 will be retrieved and displayed.

Figure 2A:
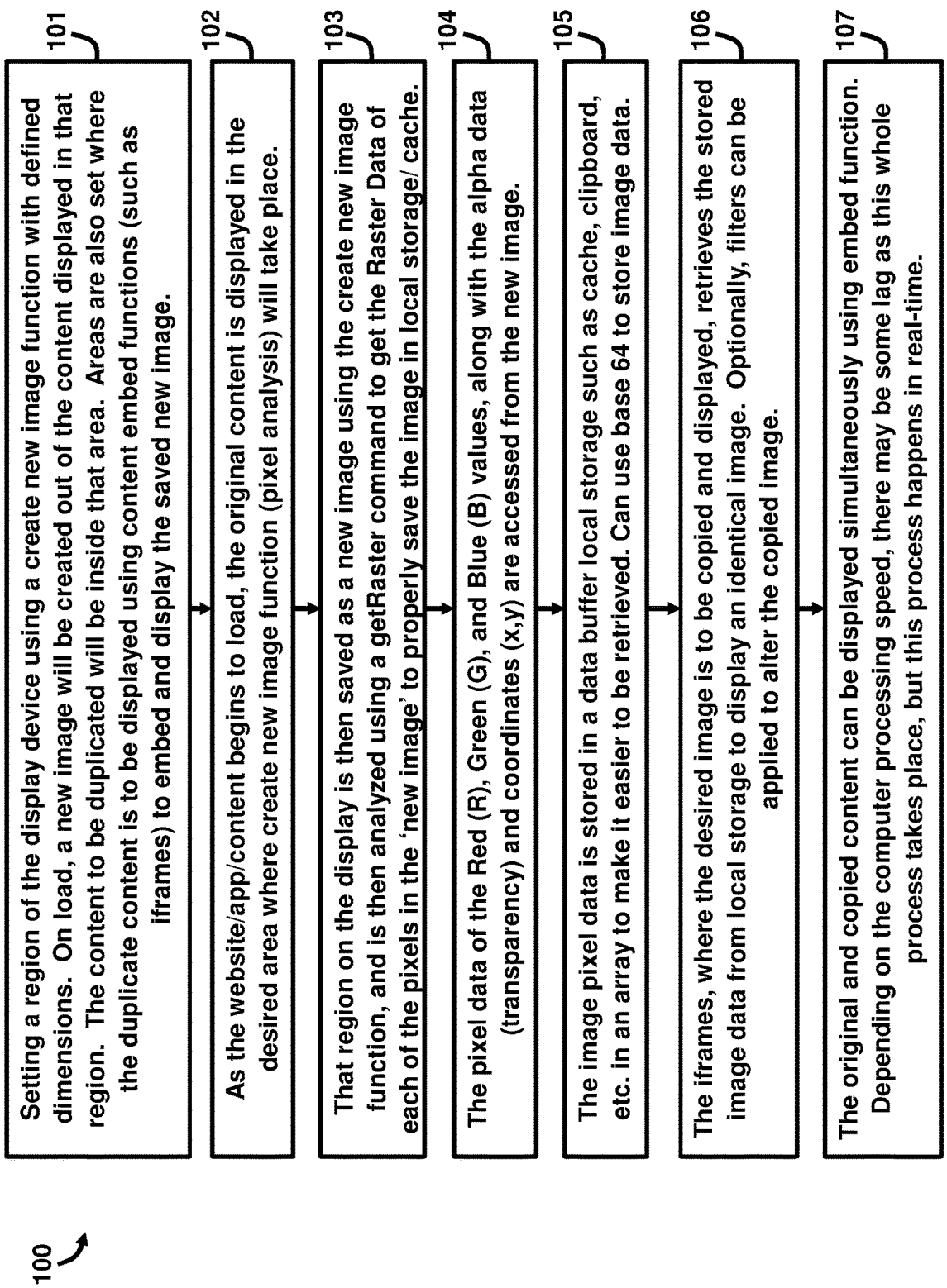
FIG. 2A is a flow diagram illustrating a method for duplicating image content, according to an embodiment herein.

This can be performed using content embed functions such as iframes, as well as other embed functions/techniques. FIG. 2A, with reference to FIG. 1, illustrates a method 100 for displaying image(s) content 50 in accordance with an embodiment herein. When attempting to display image(s) content 50, in block 101, a region is set where the image and collection of pixels are to be analyzed by saving RGB values, alpha data values, (x,y) coordinates in local storage 15 using a create new image function defined with specific image dimensions. The create new image function creates a new image out of the region set where the pixels are to be analyzed. The create new image function is a type of parameter that permits selection of the size of the area on the display device 10 where the image(s) content 50$b$ are to be displayed. This area can encompass the region where the image(s) content 50$b$ that are intended to be duplicated and are to be displayed on the website, app, or display device 10. The areas where the duplicate image(s) content 50$b$ are to be displayed are also set to the proper size using a content (image) embed function.

In block 102, when a webpage/app is loaded, the original image content 50 begins to load using a content embed function in the region specified in block 101. In block 103, the region where the original image content 50$a$ is displayed is treated as a 'new image' using a create new image function for that region. Each pixel from the 'new image' is then analyzed by the processor 20 for the RGB content, alpha data, and the coordinates of each pixel displaying those RGB values in order to properly store the new image in local storage 15. This can be performed by using a 'getRaster' or "getRasterData" command for all set values inside the new image. This is also known as the 'raster data' as the method 100 is able to determine the pixel value in a methodical and efficient way, in block 104, by reading each pixel's Red, Green, and Blue values and acquiring the x and y coordinates of each pixel. The alpha data of the pixels can also be read via this process in order to include the transparency data of the image content 50. As described in block 105, this information can then be stored as a collection of pixel data (an image) on the computing device 5 in local storage 15; i.e., a data buffer such as cache history, clipboard, or other types of local storage to temporarily store the pixel data collected as a set of arrays (which make up an image) that can then be referred to later as a template to create identical copies of that set area/image content 50$b$.

In block 106, identical image(s) content 50$b$ are then created on the same web page/app (as many as requested) in the desired places on the display device 10 as specified using the stored pixel arrays by reading the stored data collected from the pixel values and locations of the new image. The formatting may be changed, and the image content 50 can be adjusted proportionally or the image content 50 can be altered via filters if requested (as shown in FIGS. 3A-3G). Each value of Red (R), Green (G), and Blue (B) can be retrieved and displayed with the alpha data values in the proper (x,y) coordinates. If needed, a HashMap can be used to more efficiently organize and retrieve the image data (pixel) values from the local storage 15. This reduces bandwidth by only loading one image content 50, instead of loading X number of image(s) content 50.

According to block 107, when displaying the duplicate image content 50$b$, the original image content 50$a$ only has to be analyzed once before an unlimited number of duplicate image content 50$b$ can be made and displayed using an embed (image) function on that display device 10 on the computing device 5. This entire process may occur within a matter of seconds or even milliseconds, depending on the speed of the processor 20. This technique relies on the processing power of the processor 20 instead of relying on bandwidth to load the duplicate image content 50$b$.

Figure 2B:
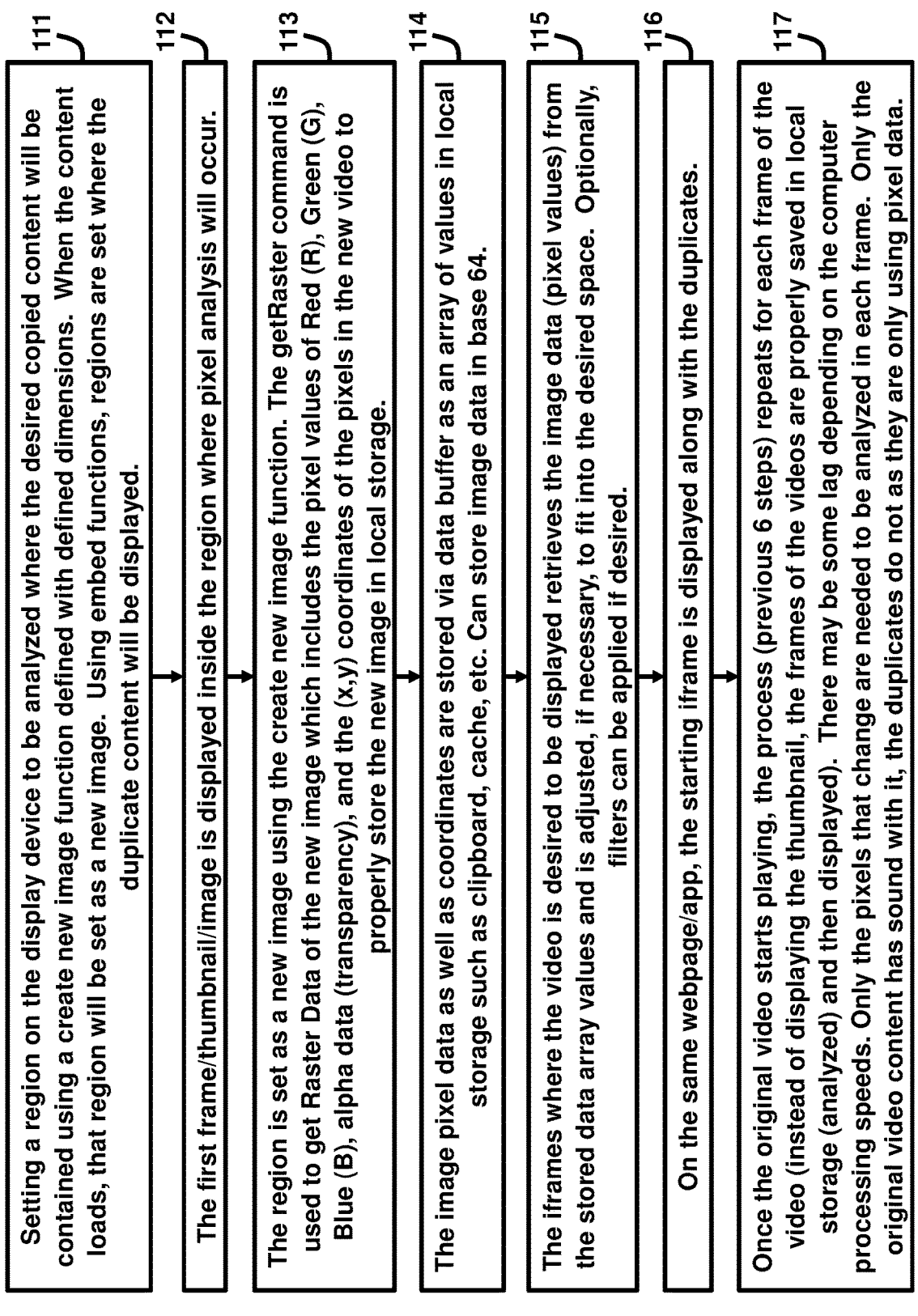
FIG. 2B is a flow diagram illustrating a method for duplicating video content, according to an embodiment herein.

This technique works for both images and videos. FIG. 2B, with reference to FIGS. 1 and 2B, illustrates a method 110 for displaying video content 50. Method 110 is almost identical to method 100 for displaying image content 50. The difference is that instead of only performing the pixel analysis once as occurs for image content 50, pixel analysis is performed at the rate of multiple frames per second in which the video content 50 is playing since videos are simply a collection of images, and images are a collection of pixels. In block 111, an area is set on the page where the desired video content 50 is to be displayed inside that region using a create new image function defined with specific dimensions. The create new image function creates a new image out of the region on the display device 10 so that pixel analysis can take place on the 'new image' once each frame of the video is displayed so that the image can be properly stored in local storage 15. The area where the duplicate video content 50 is to be displayed is also set using a content embed function, setting the source of the embed as the locally stored data from the original content.

In block 112, the first image/frame/thumbnail of the video content 50 is loaded onto the webpage/app on the display device 10 inside the region set where the duplicate video content 50 is to be displayed. In block 113, on load, each pixel inside that range (including the pixels that display the first frame/thumbnail of the video content 50) is treated as a 'new image' using a create new image function. This new image may then be analyzed by the processor 20 for the RGB content using the "getRaster" or "getRasterData" command in order to generate the raster data in order to properly store the image in the local storage 15. This data includes the Red (R), Green (G), and Blue (B) pixel values, along with the alpha data (transparency), and the coordinates of the pixels on device 10 that make up the new image. The coordinates of where the data is collected from each pixel to allow the processor 20 to access and display the duplicate video content 50. In block 114, the pixel data as well as coordinates are stored via data buffer as an array of values in local storage 15 such as a clipboard, cache memory, etc. to make it easier to retrieve the data later to display copies. In block 115, as many identical frames of that video content 50 as requested are then created on the same web page, using the stored data collected from the pixel values and locations from the starting image from the video content 50. The formatting may be changed, and the video frame can be adjusted proportionally, or the stored data can be manipulated with filters if requested (as shown in FIGS. 3A through 3G).

A HashMap can be used to more efficiently organize and retrieve the image data stored in the local storage 15. If necessary, base64 can be used to store the image data in the local storage 15. Once the video content 50 begins to play, the process of pixel analysis; i.e., setting a 'new image" each frame using the create new image function, storage, retrieving, and displaying the data is performed according to the predetermined frames per second the video is playing at or at a rate that the processor 20 can handle, and that data is displayed in the corresponding areas of the display device 10 where the video content 50 is desired. Pixel analysis is referring to the proper storage of the new image in the local storage 15 by saving the RGB values, alpha data values, and (x,y) coordinates of the pixels to be later accessed and displayed. The copied frames of the video content 50b are typically in sync, but if the processor 20 is not able to handle the playback of the duplicate video content 50b, the copied frames could be slightly delayed from the original video content 50a.

In block 116, the thumbnail or starting frame is then displayed along with the copies on the same webpage/app on the display device 10. In order to reduce the processing power burden on the computing device 5, identical pixels that do not change from frame to frame in the video content 50 do not have to be re-analyzed/changed for every frame. Rather, only the pixels that change are adjusted. In this regard, only one video content 50 is needed to be loaded, instead of X number of video content 50, thus saving valuable bandwidth space. As indicated in block 117, only the original video content 50a will have sound, but since the duplicate video content 50b will be in sync or slightly lagged, there is no need for the duplicate video frames to have sound. This technique utilizes the processing power of the processor 20 instead of computer bandwidth. The video content 50 can be displayed on the display device 10 via an embedding technique such as iframe embeds. Furthermore, this technique works since videos are simply a collection of frames (images) strung together one after the other, and images are simply made up of pixels.

Figure 3B:
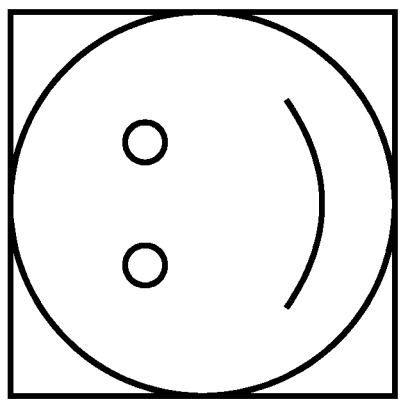
FIG. 3B is a schematic diagram illustrating duplicated image/video content, according to an embodiment herein.
Figure 3A:
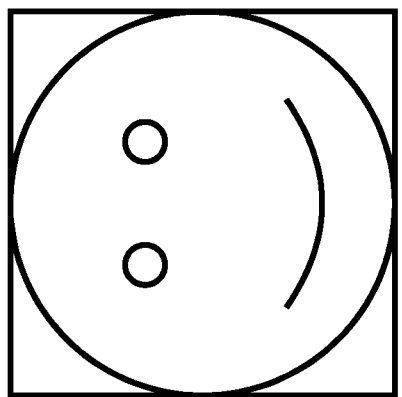
FIG. 3A is a schematic diagram illustrating original image/video content, according to an embodiment herein.

FIG. 3A through FIG. 3G, with reference to FIGS. 1 through 2B, are schematic diagrams depicting examples of original and duplicate multimedia content 50a, 50b, in accordance with the embodiments herein utilizing the duplication techniques provided by methods 100, 110. FIG. 3A is a schematic diagram illustrating an original image or video content 50a that may be loaded onto a computing device 5 for image/video processing by processor 20, and for display on the display device 10. The square 55 around the image/video content 50a represents where the create new image function for pixels are being analyzed for the RGB values, alpha data, and (x,y) coordinates.

FIG. 3B through FIG. 3G show non-limiting examples of the different ways the original image/video content 50a of FIG. 3A could be displayed and copied/altered by changing the values of the RGB and alpha values stored in the array. The copied content 50b can be provided by altering the stored pixel data (color values; e.g., changing RGB values of these pixels from (25, 25, 25) to (65, 65, 65), for example) in the array of the data the new image stores in the data buffer of the local storage 15. It is not necessary to display the images/video content 50b in all or one of those formats in FIGS. 3B through 3G, but it is possible to do so by altering the values in the array. The copied image/video content 50b in FIGS. 3B-3G do not require any bandwidth for their display so as long as the original image/video content 50a of FIG. 3A is properly displayed on the display device 10 and processor 20 is able to handle the create new image and retrieval of that data to display.

Figure 3D:
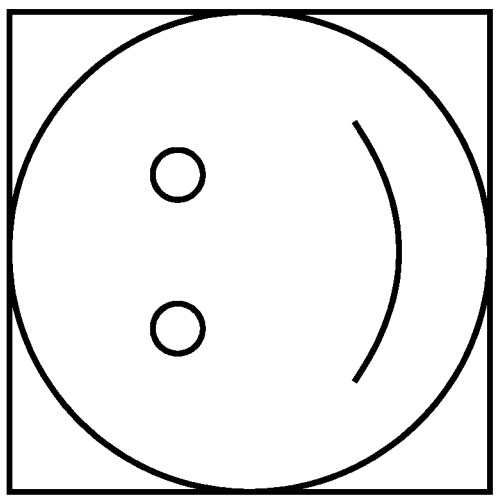
FIG. 3D is a schematic diagram illustrating duplicated and proportionally enlarged image/video content, according to an embodiment herein.
Figure 3C:
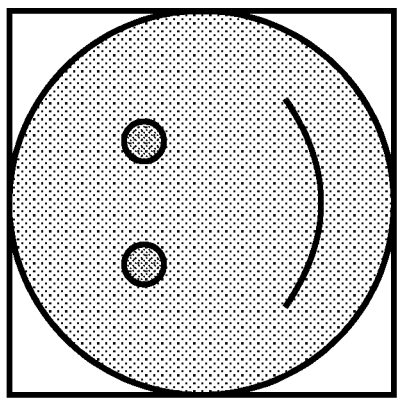
FIG. 3C is a schematic diagram illustrating duplicated and color-filtered image/video content, according to an embodiment herein.
Figure 3G:
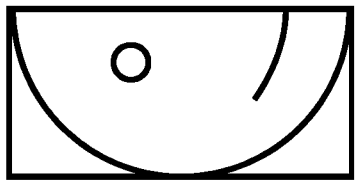
FIG. 3G is a schematic diagram illustrating duplicated and truncated image/video content, according to an embodiment herein.
Figure 3F:
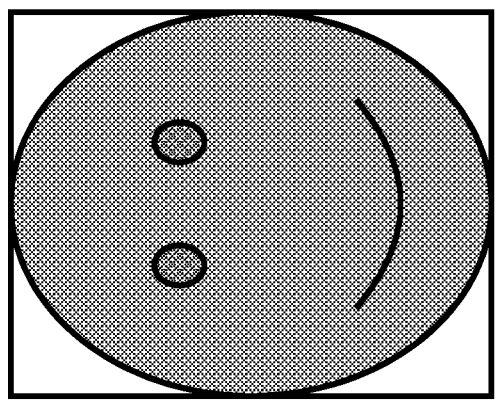
FIG. 3F is a schematic diagram illustrating duplicated, color-filtered, and non-proportionally enlarged image/video content, according to an embodiment herein.
Figure 3E:
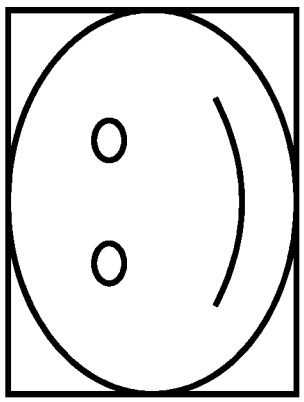
FIG. 3E is a schematic diagram illustrating duplicated and non-proportionally shrunk image/video content, according to an embodiment herein.

FIG. 3B is an example of the way the copied image/video content 50b would look if no adjustments were made to the data before displaying the copied content 50b. FIGS. 3C-3G show how the data in the array could be altered to change the way the "duplicate" is displayed on the display device 10. FIGS. 3A-3G represent how both image/video content 50a, 50b can be displayed as a final result on the display device 10. FIG. 3C depicts an example of the copied image/video content 50b with a colored filter. FIG. 3D depicts an example of the copied image/video content 50b that has been proportionally enlarged from the original image/video content 50a. FIG. 3E depicts an example of the copied image/video content 50b that has been disproportionally reduced in size from the original image/video content 50a. FIG. 3F depicts an examples of the copied image/video content 50b that has been disproportionally enlarged from the original image/video content 50 and containing a colored filter. FIG. 3G depicts an example of the copied image/video content 50b that has been partially truncated and not displayed on the display device 10.

The methods 100, 110 create a new image/video content 50b from the region where original content 50a that is requested to be displayed multiple times on the same webpage/app on the display device 10 and then using the pixel data encoded in that 'new image' (the original area) to be used as a template for identical copies of the content 50b. This way, that data (image) can then be called from the local storage 15 to be used as a template and displayed wherever necessary without using extra bandwidth since it has already been loaded once onto the computing device 5 and stored in the local storage 15. The create new image is a type of parameter that permits setting the location of the region in which the pixel analysis is to take place to save whatever is displayed in that region on the display device 10 as a new image to perform the pixel analysis to properly store the image data by accessing Raster Data. Therefore, no matter what is loaded onto those specific pixels on the computing device 5, the processor 20 is able to create an identical copy of the original content 50a and display the copied content 50b without using extra bandwidth. The steps are further shown schematically in FIG. 4A through FIG. 4C, with reference to FIGS. 1 through 3G.

FIG. 4A illustrates an example of a display device 10 during an initial step(s) in a multimedia content duplication process. Here, no content has been loaded for display, however area 65 depicts an example region where the original content will be loaded and the area 70 where duplicate content will be loaded. The areas 65, 70 are pre-set, according to an example. The actual borders do not have to be shown on the display device 10, but are displayed in the figures for ease of explanation. Area 65 may be set using the create new image function defined with specific dimensions so that it is able to create a new image out of whatever content is displayed in the area. Area 65 is the region where pixel analysis to properly store data in the local storage 15 from the create new image function is performed. The original multimedia content 50a is to be displayed within this area 65. Area 65 is the region where the create new image function occurs by creating a new image when the content loads there and takes a snapshot of it to perform pixel analysis. Area 70 may be set using the content embed function such as an iframe to display the duplicate content 50b after the pixel analysis is performed to store the data and eventually, the data is retrieved.

FIG. 4B illustrates an example of a display device 10 during a subsequent step(s) in the multimedia content duplication process. Here, the original content 50a is loaded (e.g., onto a webpage, app, etc.) for display on the display device 10 to be used as a template to create the duplicate content 50b. The original content 50a is loaded using the content embed function to recall the saved new image from the local storage 15, and the area 65 is set as a new image using the create new image function which then allows for the pixel data of RGB values of the pixels inside area 65, the alpha data, and the (x,y) coordinates of the pixels (i.e., raster data) to be accessed (the RGB values, alpha data, and x,y coordinates comprise the new image snapshot that is stored in the local storage 15). This information is stored in a data buffer local storage 15 to be retrieved for subsequent processing by processor 20 to create duplicate content 50b. Area 70 remains blank in FIG. 4B until the pixel analysis of area 65 is completed and the data is retrieved from local storage 15.

Figure 4C:
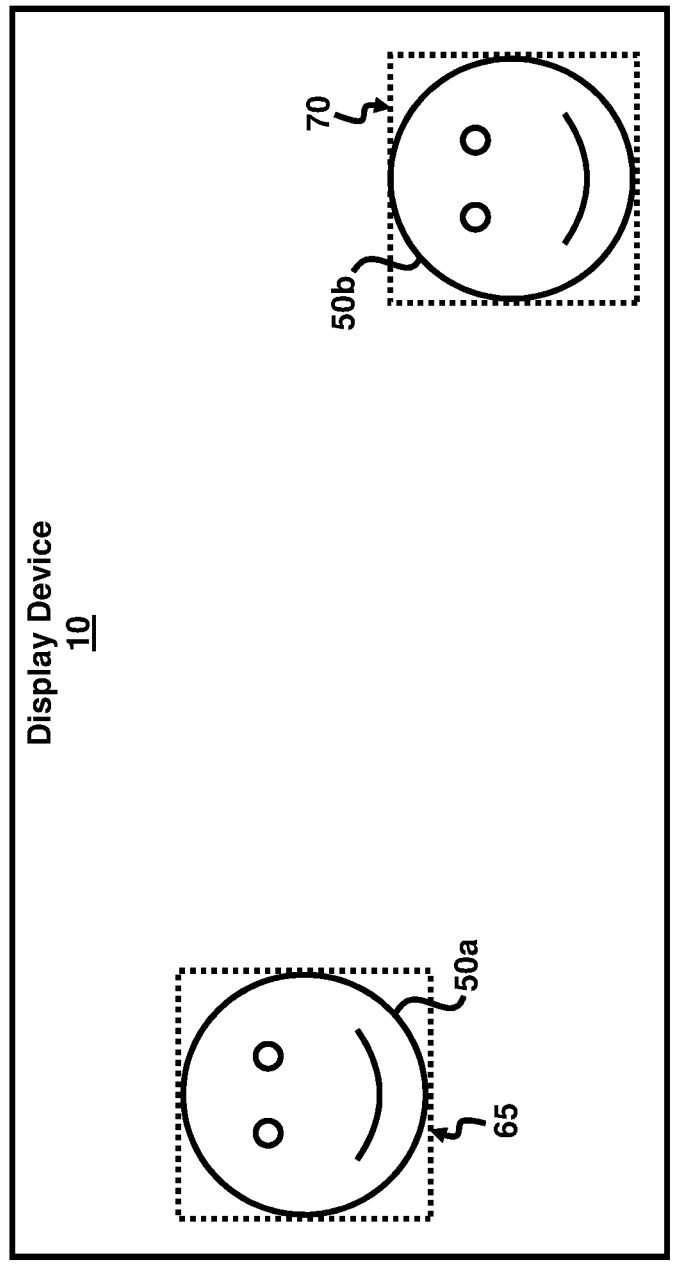
FIG. 4C is a schematic diagram illustrating a display device showing placement of original and duplicated multimedia, according to an embodiment herein.

FIG. 4C illustrates an example of a display device 10 during a final step(s) in the multimedia content duplication process. The processor 20 retrieves and compiles the stored image pixel data from the local storage 15 as duplicate content 50b in the area 70 set using the content embed function. The original content 50a and duplicate content 50b are both displayed on the display device 10. In this case, only half the computer bandwidth is utilized to load the two image/video content 50a, 50b. The duplicate content 50b may be presented in accordance with the examples shown in FIGS. 3B through 3G, as well as other modifications.

The create new image function occurs in area 65 to set that content as a new image to access the Raster Data, store that data in local storage 15, and later retrieve it to display in area 70. Moreover, the original content 50a can be read by accessing the raster data of that new image, storing it as an array in local storage 15 for that new image, and displaying the duplicate content 50a wherever desired. When attempting to display videos with this technique, the create new image function is still used to analyze each frame of the video, since videos are a collection of images, and images are a collection of pixels. For each frame of the video, the previous data in the local storage 15 from the previous frame can be overwritten to prevent an excess amount of the local storage 15 from being used.

In an example, the embodiments herein may provide a computer program product configured to include a pre-configured set of instructions, which when performed, may result in actions as stated in conjunction with the methods 100, 110 described above. In an example, the pre-configured set of instructions may be stored on a tangible non-transitory computer readable medium. In an example, the tangible non-transitory computer readable medium may be configured to include the set of instructions, which when performed by the computing device 5, may cause the computing device 5 to perform acts similar to the ones described here.

Computer executable instructions, associated data structures, and program modules represent examples of the program code means for executing steps of the methods 100, 110 disclosed herein. The particular sequence of such executable instructions or associated data structures represents examples of corresponding acts for implementing the functions described in such steps.

The techniques provided by the embodiments herein may be implemented on an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
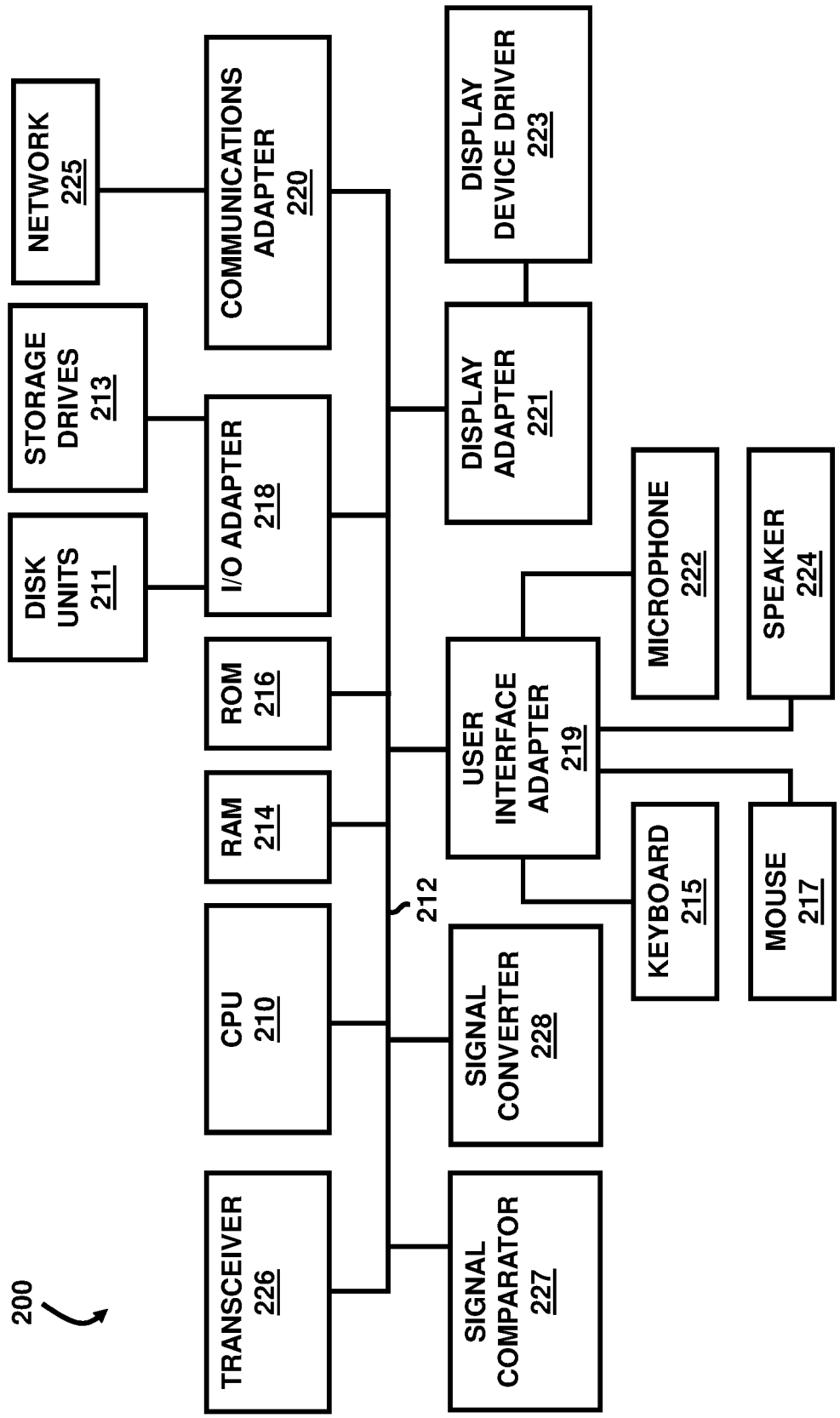
FIG. 5 illustrates a computer system used for implementing an embodiment herein.

A representative hardware environment for practicing the embodiments herein is depicted in FIG. 5, with reference to FIGS. 1 through 4C. This schematic drawing illustrates a hardware configuration of an information handling/computer system 200 in accordance with an exemplary embodiment herein. The system 200 comprises at least one processor or central controller (CPU) 210. The CPUs 210 are interconnected via system bus 212 to various devices such as a random access memory (RAM) 214, read-only memory (ROM) 216, and an input/output (I/O) adapter 218. The I/O adapter 218 may connect to peripheral devices, such as disk units 211 and storage drives 213, or other program storage devices that are readable by the system 200. The system 200 may read the computer-executable instructions on the program storage devices and follow these instructions to execute the methods 100, 110. The system 200 may further include a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device driver 223, which provides a GUI (e.g., a gadget) in accordance with the embodiments herein, or which may be embodied as an output device such as a display device 10, monitor, printer, or transmitter, for example. Further, a transceiver 226, a signal comparator 227, and a signal converter 228 may be connected to the bus 212 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for performing multimedia content processing in a computing device, the method comprising:
providing a first multimedia content to be displayed in a first predetermined region of a display device;
establishing a second predetermined region on the display device where a second multimedia content is to be displayed, wherein the second multimedia content is a derived version of the first multimedia content;
loading an electronic document on the display device causing the first multimedia content to be displayed in first predetermined region on the display device;
copying the first multimedia content displayed in the first predetermined region by creating the second multimedia content from the first predetermined region;
analyzing raster data associated with the first multimedia content to store image data from a snapshot of the first multimedia content;
storing raster data associated with each pixel of the first multimedia content in a local storage of the computing device;
creating a duplicate version of the first multimedia content based on stored image pixel data; and
displaying the second multimedia content in the second predetermined region.

2. The method of claim 1, wherein the multimedia content comprises any of an image and a video.

3. The method of claim 1, wherein the raster data comprises pixel values of RGB (red, green, blue) data, alpha data, and x,y coordinates of pixels associated with the content created from a new image from the first multimedia content.

4. The method of claim 1, comprising establishing the first predetermined region using a create new image function and the second predetermined region using a computer-enabled content embed function.

5. The method of claim 1, wherein the first multimedia content and the second multimedia content are identical.

6. The method of claim 1, comprising modifying the second multimedia content.

7. The method of claim 1, wherein the electronic document comprises any of a webpage and an application software document.

8. A non-transitory program storage device readable by a computing device, and comprising a program of instructions executable by the computing device to perform a method for performing multimedia content processing in the computing device, the method comprising:
providing a first multimedia content to be displayed in a first predetermined region of a display device;
establishing a second predetermined region on the display device where a second multimedia content is to be displayed, wherein the second multimedia content is a derived version of the first multimedia content;
loading an electronic document on the display device causing the first multimedia content to be displayed in first predetermined region on the display device;
copying the first multimedia content displayed in the first predetermined region by creating the second multimedia content from the first predetermined region;
analyzing raster data associated with the first multimedia content to store image data from a snapshot of the first multimedia content;

storing raster data associated with each pixel of the first multimedia content in a local storage of the computing device;

creating a duplicate version of the first multimedia content based on stored image pixel data; and displaying the second multimedia content in the second predetermined region.

9. The program storage device of claim 8, wherein the multimedia content comprises any of an image and a video.

10. The program storage device of claim 8, wherein the raster data comprises pixel values of RGB (red, green, blue) data, alpha data, and x,y coordinates of pixels associated with the content created from a new image from the first multimedia content.

11. The program storage device of claim 8, wherein the first predetermined region is established using a create new image function and the second predetermined region using a computer-enabled content embed function.

12. The program storage device of claim 8, wherein the first multimedia content and the second multimedia content are identical.

13. The program storage device of claim 8, wherein the second multimedia content is modified.

14. The program storage device of claim 8, wherein the electronic document comprises any of a webpage and an application software document.

15. A computing system comprising:
a display device;
a local storage memory component; and
a processor to:
provide a first multimedia content to be displayed in a first predetermined region of the display device;
establish a second predetermined region on the display device where a second multimedia content is to be displayed, wherein the second multimedia content is a derived version of the first multimedia content;
load an electronic document on the display device causing the first multimedia content to be displayed in first predetermined region on the display device;
copy the first multimedia content displayed in the first predetermined region by creating the second multimedia content from the first predetermined region; and
analyze raster data associated with the first multimedia content to store image data from a snapshot of the first multimedia content;
wherein the local storage memory component is to store raster data associated with each pixel of the first multimedia content,
wherein the processor is to create a duplicate version of the first multimedia content based on stored image pixel data, and
wherein the display device is to display the second multimedia content in the second predetermined region.

16. The computing system of claim 15, wherein the multimedia content comprises any of an image and a video, and wherein the electronic document comprises any of a webpage and an application software document.

17. The computing system of claim 15, wherein the raster data comprises pixel values of RGB (red, green, blue) data, alpha data, and x,y coordinates of pixels associated with the content created from a new image from the first multimedia content.

18. The computing system of claim 15, wherein the processor is to establish the first predetermined region using a create new image function and the second predetermined region using a computer-enabled content embed function.

19. The computing system of claim 15, wherein the first multimedia content and the second multimedia content are identical.

20. The computing system of claim 15, wherein the processor is to modify the second multimedia content.

* * * * *